United States Patent
Radhakrishnan et al.

(10) Patent No.: US 7,477,632 B1
(45) Date of Patent: Jan. 13, 2009

(54) SUBSCRIBER MANAGEMENT AND SERVICE PROFILES

(75) Inventors: Ramesh Radhakrishnan, Saratoga, CA (US); Paul Lambert, Mountain View, CA (US); Haresh M. Kubhani, San Jose, CA (US)

(73) Assignee: QUALCOMM, Inc., San Diego, CA (US)

( * ) Notice: Subject to any disclaimer, the term of this patent is extended or adjusted under 35 U.S.C. 154(b) by 491 days.

(21) Appl. No.: 11/036,184

(22) Filed: Jan. 14, 2005

Related U.S. Application Data

(60) Provisional application No. 60/537,156, filed on Jan. 16, 2004.

(51) Int. Cl.
*H04Q 7/24* (2006.01)
(52) U.S. Cl. .................................... 370/338
(58) Field of Classification Search ................ 370/310, 370/338, 342–345; 455/410, 411; 709/225; 713/182; 726/1, 2, 16–21
See application file for complete search history.

(56) References Cited

U.S. PATENT DOCUMENTS

| | | | | |
|---|---|---|---|---|
| 5,719,942 | A * | 2/1998 | Aldred et al. | 709/228 |
| 6,330,586 | B1 * | 12/2001 | Yates et al. | 709/201 |
| 6,363,151 | B1 * | 3/2002 | Linder | 380/247 |
| 6,446,200 | B1 * | 9/2002 | Ball et al. | 713/1 |
| 6,697,806 | B1 * | 2/2004 | Cook | 707/10 |
| 6,801,528 | B2 * | 10/2004 | Nassar | 370/389 |
| 7,006,481 | B2 * | 2/2006 | Terry | 370/338 |
| 7,073,055 | B1 * | 7/2006 | Freed et al. | 713/155 |
| 7,103,313 | B2 * | 9/2006 | Heinonen et al. | 455/41.2 |
| 7,313,111 | B2 * | 12/2007 | Hietalahti et al. | 370/329 |
| 2002/0029260 | A1 * | 3/2002 | Dobbins et al. | 709/219 |
| 2002/0132611 | A1 * | 9/2002 | Immonen et al. | 455/414 |
| 2003/0036383 | A1 * | 2/2003 | Zawislak et al. | 455/433 |
| 2004/0100973 | A1 * | 5/2004 | Prasad | 370/401 |
| 2004/0258003 | A1 * | 12/2004 | Kokot et al. | 370/254 |
| 2005/0232209 | A1 * | 10/2005 | Buckley et al. | 370/338 |

FOREIGN PATENT DOCUMENTS

EP    1246445 A1 * 10/2002

OTHER PUBLICATIONS

"Lookup table". Retrieved from http://en.wikipedia.org/wiki/Lookup_table on Jun. 5, 2008.*

* cited by examiner

*Primary Examiner*—Lester Kincaid
*Assistant Examiner*—Nathan Mitchell
(74) *Attorney, Agent, or Firm*—Amin, Turocy & Calvin, LLP

(57) ABSTRACT

The subject invention relates to methods and systems for determining wireless network service characteristics involving receiving at an access point (AP) a request from a station (STA) for wireless network access, obtaining a first identifier specifying a wireless local area network (WLAN) to which the STA is to be connected, obtaining a second identifier from an authentication process relating to the STA, determining a service profile for the STA based on the first identifier and the second identifier, wherein the service profile specifies a value for each of a plurality of service attributes, and establishing a connection for wireless communications between the STA and the AP based on the service profile, wherein the connection is characterized by the value specified for each of the plurality of service attributes.

23 Claims, 5 Drawing Sheets

| SSID | Group | Service Profile ||||
| | | VLAN | QoS | Security Level | Guest Portal |
| --- | --- | --- | --- | --- | --- |
| CORP | Development | 1 | 1 | AES | off |
| CORP | Marketing | 2 | 2 | TKIP | off |

Fig. 3

| SSID | User Group | Service Profile | | | |
|------|------------|------|-----|----------|-------|
|      |            | VLAN | QoS | Security | Other |
| CORP | Eng.       | 7    | 4   | AES      | ...   |
| CORP | Finance    | 8    | 3   | AES      | ...   |
| CORP | Admin      | 9    | 2   | TKIP     | ...   |

Fig. 4

SUBSCRIBER MANAGEMENT AND SERVICE PROFILES

CROSS-REFERENCES TO RELATED APPLICATIONS

This application claims priority from U.S. provisional application No. 60/537,156, filed Jan. 16, 2004, which is hereby incorporated by reference.

BACKGROUND OF THE INVENTION

As use of wireless local area networks (WLANs) become increasingly widespread, there is a growing need for improved management of connection characteristics. For example, wireless network connectivity is fast becoming a service that is branded and sold, with product differentiation based on properties such as varying levels of quality of service (QoS). A particular brand of wireless network connection service may offer a range of service levels, such as a "basic" service offered at lower price, a "premium" service at a higher price, and possibly numerous stratifications in between. Service levels may be associated with different connection speeds, security levels, etc. Services may be offered on different time and/or event bases, such as monthly, daily, hourly, by the minute, per session, per visit, etc. What is more, each brand may offer its own unique lineup of different services.

At any given location, a user may be offered many brands of service, as well as different types of services for each brand. It may be the same physical equipment that must handle the different brands and types of services. Unfortunately, current systems define connection characteristics in rigid structures, often based on networking features that primarily serve other purposes. Thus, such systems fail to provide a flexible scheme for offering a wide range of different connection characteristics. This has limited the extent to which different services may be designed and offered to consumers.

FIG. 1 presents a typical system 100 in which different levels of service may be provided. As depicted in the figure, system 100 includes a station (STA) 102 that makes a wireless connection with an access point (AP) 104. In this manner, STA 102 may reach the rest of system 100 via its connection with AP 104. System 100 includes a WLAN 106, which is identified by a unique service set identifier (SSID). The SSID may comprise a sequence of characters. Such an SSID allows STAs to connect to the desired WLAN when a number different WLANs are present at a particular location. As shown in FIG. 1, WLAN 106 comprises AP 104 and STA communicating with AP 104. However, in some cases, a WLAN may comprise numerous APs and STAs. Also, in some cases, an AP may support multiple WLANs.

To connect to WLAN 106, STA 102 may first make an association with AP 104. This may require STA 102 to specify the appropriate SSID that identifies WLAN 106. Alternatively, STA 102 may not specify a particular SSID and be assigned to WLAN 106 by default. Next, a user may be required to go through an authentication process to authenticate itself, before being allowed access to system 100. Here the user may refer broadly to either STA 102 or a person using STA 102 to access network resources.

Just as an example, the authentication process may involve utilizing a Remote Authentication Dial-In User Service (RADIUS) protocol. Such a RADIUS authentication process would allow the user to be authenticated against user data stored at a central database located elsewhere. When authenticated is successfully completed, STA 102 may be allowed to connect to system 100. Further, STA 102 may be assigned to a particular virtual local area network (VLAN). Such a VLAN allows different devices to be mapped together as if they existed on the same physical network, even if they do not, and provides a logical way for organizing different devices.

In prior art systems, the assignment of connection characteristics such as QoS is typically based on a rigid structure. For example, in some systems, connection characteristics may be determined based on the SSID. In other words, a particular WLAN identified by an SSID may provide wireless network service having a fixed set of connection characteristics. Under such a scheme, a user that wishes to have certain QoS may have to choose a particular SSID that offers such a QoS. To obtain a different QoS, the user may have to switch to a different SSID. This presents a somewhat inflexible system. For instance, a particular brand of wireless network connection service may be forced to maintain numerous WLANS, each with its own SSID and QoS, such that users would have to choose to connect to the appropriate WLAN for the desired QoS.

As another example, in other systems, connection characteristics may be tied to the assignment of VLANs. That is, connection characteristics may be determined base on the identity of the VLAN to which the STA is assigned. Here, a user that wishes to have a certain QoS may have to choose a particular VLAN that offers such a QoS. To obtain a different QoS, the user may have to switch to a different VLAN. This again presents a somewhat inflexible system. The logical use of VLANs for organizing devices may be hampered as a result of using VLAN assignments to determine connection characteristics. Indeed, STAs in the same VLAN may require different connection characteristics. For instance, different computers in the same department of a corporation may need to be organized on the same VLAN so that they can communicate with each other and be managed efficiently. However, a manager's computer may require different connection characteristics, such as QoS or security level, as a clerk's computer, even though they are assigned to the same VLAN.

These and other disadvantages associated with current systems for determining connection characteristics limit the potential of WLAN networks to provide efficient and flexible wireless network connection services to users. As the use of wireless networks increases, there is an ever growing need for improved techniques for determining connection characteristics.

BRIEF SUMMARY OF THE INVENTION

The present invention relates to methods and systems for determining wireless network service characteristics involving receiving at an access point (AP) a request from a station (STA) for wireless network access, obtaining a first identifier specifying a wireless local area network (WLAN) to which the STA is to be connected, obtaining a second identifier from an authentication process relating to the STA, determining a service profile for the STA based on the first identifier and the second identifier, wherein the service profile specifies a value for each of a plurality of service attributes, and establishing a connection for wireless communications between the STA and the AP based on the service profile, wherein the connection is characterized by the value specified for each of the plurality of service attributes.

The first identifier specifying a WLAN may comprise a service set identifier (SSID). In one embodiment of the invention, the SSID is associated with a wireless network connection service provider. The second identifier may comprise a group identifier associated with the STA, wherein the group identifier indicates membership of the STA in a group.

The authentication process may involve authenticating a user of the STA by using a Remote Authentication Dial-In User Service (RADIUS) process. One of the plurality of service attributes may identify a virtual local area network (VLAN). One of the plurality of service attributes may identify a quality of service (QoS). One of the plurality of service attributes may identify a security level. One of the plurality of service attributes may identify a guest portal state.

BRIEF DESCRIPTION OF THE DRAWINGS

FIG. 3 presents an array illustrating the assignment of different service profiles based on SSID and group identifier information.

FIG. 4 presents another array illustrating the assignment of different service profiles based on SSID and group identifier information.

DETAILED DESCRIPTION OF THE INVENTION

Figure 1:
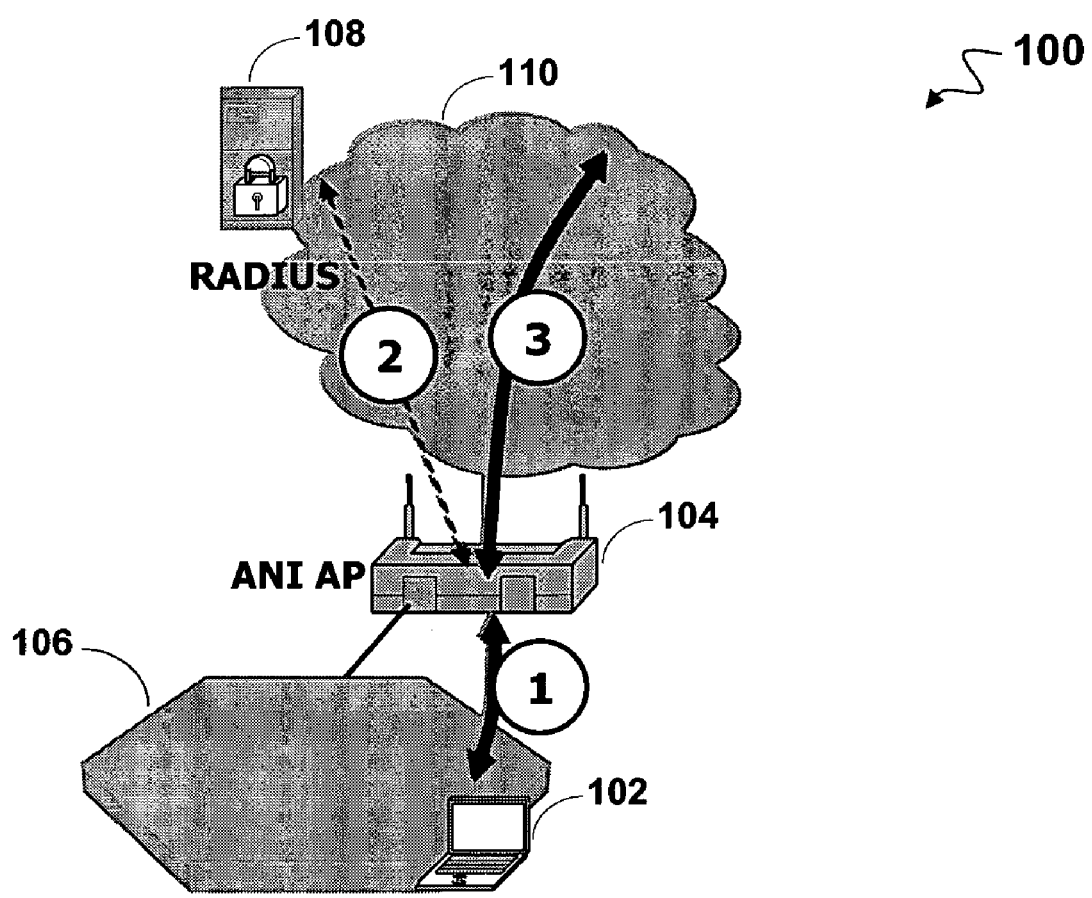
FIG. 1 presents a typical system 100 in which different levels of service may be provided.
Figure 2:
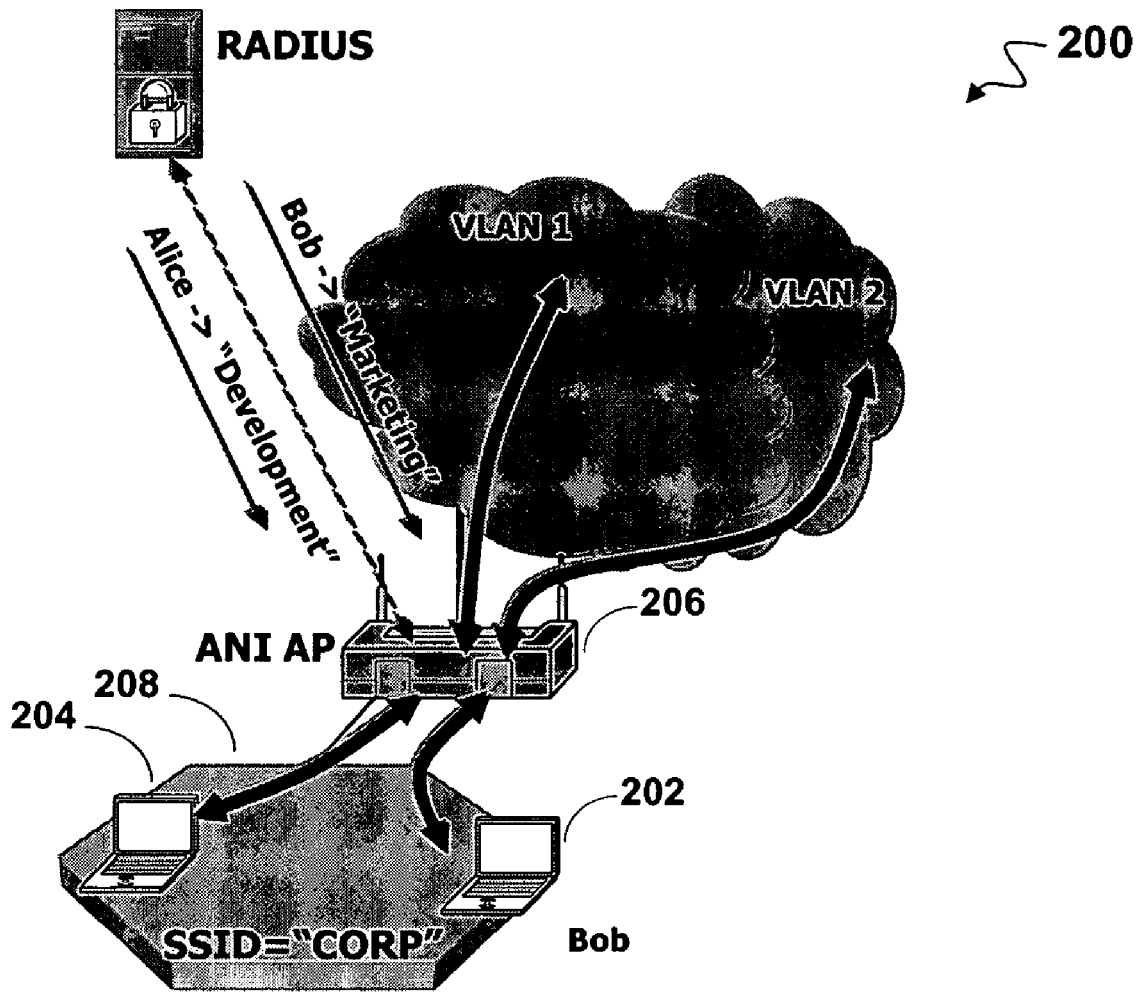
FIG. 2 presents a system 200 in which a service profile for a wireless network connection is determined based on an identifier specifying a WLAN and an identifier obtained from an authentication process, according to one embodiment of the present invention.

FIG. 2 presents a system 200 in which a service profile for a wireless network connection is determined based on an identifier specifying a WLAN and an identifier obtained from an authentication process, according to one embodiment of the present invention. As shown the figure, system 200 includes STA 202 and STA 204, which connect wirelessly to AP 206. System 200 includes WLAN 208, which is identified by a unique service set identifier (SSID). To connect to WLAN 208, STAs 202 and 204 may each make an association with AP 206. As shown in FIG. 2, both STAs 202 and 204 are connected to WLAN 208. Here, STA 202 corresponds with a user named Bob, and STA 204 corresponds with a user named Alice. WLAN 208 is shown as being identified by an SSID known as "CORP." WLAN may be implemented in accordance with well known 802.11 wireless local area network standards or variations of such standards.

After association, each user may required to go through an authentication process to authenticate itself, before being allowed access to system 200. As discussed previously, the authentication process may utilize, for example, a RADIUS protocol. The RADIUS authentication process would allow the user to be authenticated against user data stored elsewhere. The authentication process may yield certain information relating to the user that is sent back to AP 206. In the present embodiment of the invention, a group identifier referred to as a group tag returned by the RADIUS authentication process. As shown in FIG. 2, for example, the authentication process for STA 202 may return a group tag indicating that the user at STA 202, Bob, belongs to a group referred to as "Marketing." Similarly, the authentication process for STA 204 may return a group tag indicating that the user at STA 204, Alice, belongs to a group referred to as "Development."

According to the present embodiment of the invention, AP 206 utilizes the SSID specifying WLAN 208 and the group tag returned from the authentication processes for each STA to determine a service profile for the STA. The wireless network connection provided by system 200 then provides wireless network connection to the STA consistent with the particular service profile determined for the STA. In the present embodiment of the invention, service profiles allow different levels of service to be defined for individual users. A user may be provided a different level of service by being categorized as a member of a group. Membership of a group can be flexibly defined. For instance, a "group" can have a single member, though a group may typically have a plurality of members.

FIG. 3 presents an array illustrating the assignment of different service profiles based on SSID and group identifier information. Two service profiles are shown as examples, although more service profiles and variations may be defined in accordance with the present invention. A first profile is determined based on the SSID having value of "CORP" and the group tag having a value of "Development." Alice at STA 204, for instance, may be assigned this service profile. The profile specifies a number of service attributes.

Here, the first service profile specifies a VLAN attribute as having a value of "1," which identifies a particular virtual local area network to which the user may be assigned. The first service profile also specifies a quality of service (Qos) attribute as having a value of "1," which identifies a particular level of service for the data connection provided. This may indicate a particular transmission rate, error rate, and/or other connection characteristics. Further, the first service profile specifies a security level attribute as having a value of "AES," or Advance Encryption Standard. As is known in the art, AES is an encryption algorithm for securing data originally adopted by the U.S. government but increasing adopted as a standard for commercial use to encrypt data transmissions. Finally, the first service profile specifies a guest portal attribute as having a value of "off." This attribute indicates whether or not a particular user is to be directed to a "guest portal," which may involve restricting a user to a specific, limited-access portion of a network environment. For instance, an STA belonging to a person visiting a corporation's premises may be directed to such a guest portal. From the guest portal, the visitor may be allowed to access general network resources outside the corporation, such as the Internet, but not allowed to access the corporation's computer network.

Referring again to FIG. 3, a second service profile is also depicted. Bob at STA 202, for instance, may be assigned this service profile. The second service profile specifies a VLAN attribute as having a value of "2," which identifies a different virtual local area network to which the user is assigned. The second service profile also specifies a QoS attribute as having a value of "2." In addition, the second service profile specifies a security level attribute as having a value of "TKIP," or Temporal Key Integrity Protocol. As is known in the art, TKIP is a protocol defined as part of the IEEE 802.11i encryption standard for wireless LANs. TKIP represents a next generation of WEP, the Wired Equivalency Protocol, which is used to secure 802.11 wireless LANs.

By utilizing both SSID and group tag information to determine the specific service profile applied for each user in the present embodiment of the invention, the system is capable of flexibly offering different levels of service. The service level is not dictated entirely by the SSID. Different users having the same SSID may be assigned different levels of service. For instance, while users referred to here as Alice and Bob both have the same SSID, they belong to different groups as indicated by their different group tags. As described above, these two users having the same SSID may have different service profiles based on their membership in different groups as identified by their respective group tags.

Furthermore, the determination of the service profile applied to each user in the present embodiment of the invention is not necessarily tied to the assignment of VLANs. This allows VLANs to be assigned freely, without being restricted to match the type of service provided. Users do not need to be assigned to different VLANs in order to received different levels of service. Indeed, different users assigned to the same VLAN may have different service needs, and they may each be provided a different service profile in accordance with the present embodiment of the invention.

In accordance with one embodiment of the invention, the authentication server, e.g., RADIUS server, does not forward the specific attribute values of each service profile to the AP. Instead, the authentication server forwards the group tag, and the AP determines the appropriate service profile and appropriate attribute values for that service profile. This implementation may be particularly useful in a situation where the type of service provided to the user needs to be controlled locally.

FIG. 4 presents another array illustrating the assignment of different service profiles based on SSID and group identifier information. Three service profiles are shown as examples, although more service profiles and variations may be defined. A first profile is determined based on the SSID having value of "CORP" and the group tag having a value of "Eng." A second service profile is determined based on the SSID having a value of "CORP" and the group tag having a value of "Finance." A third service profile is determined based on the SSID having a value of "CORP" and the group tag having a value of "Admin." Again, for each service profile, a particular value may be specified for each of a number of attributes. Here, the attributes include VLAN, QoS, Security, and Other. Alternative and/or additional attributes may also be used.

The various groups shown in FIG. 4 can be seen as groups associated with different service levels provided by a wireless network connection service. The name of the service provider may be indicated by the SSID. Thus, the SSID of "CORP" may indicate a particular service provider available for providing wireless network connectivity to the STA. In one embodiment of the invention, the AP provides connections for a single wireless network service provider. In another embodiment, the AP provides connection for a number of wireless service providers. In the present example, a single service provider is discussed. Referring to FIG. 4, the groups "Eng.," "Finance," and "Admin" can be seen instead as the groups "Gold," "Silver," and "Bronze," which may correspond with three different levels of service provided by the service provider. Users belonging to the "Gold" group may receive the best service. Thus, a service profile may be determined for the case of the SSID having a value of "CORP" and the group tag having a value of "Gold." The service profile thus specifies service attributes applied at the AP for the "Gold" level of service. For instance, the service profile may indicate that the STA is to be assigned to a particular VLAN labeled "7," receive a QoS defined as level "4," and have a security attribute value of "AES." Similarly, a service profile may be determined that specifies service attributes applied at the AP for the "Silver" level of service. Also, a service profile may be determined that specifies service attributes applied at the AP for the "Bronze" level of service.

According to one embodiment of the invention, a service profile may be determined for a user even if the authentication process does not return a group identifier. Under some circumstances, an authentication process may not return a group identifier. For example, perhaps a user is authenticated, but no group membership information is available for the user. In such a case, authentication may be successful, but no group identifier is returned. Here, a default service profile may be used. For example, if it is known that a user is authenticated, but it is not know what group the user belongs to, a default service profile indicating a basic level of service may be provided to the user.

According to one embodiment of the invention, a service profile may be determined for a user even if a user is not authenticated. For instance, an authentication process may have returned a negative result, rejecting authentication for the user. Or perhaps, no attempt has been made to authenticate the user for some reason. Here, a default service profile may be used. This default service profile may be the same or a different profile than that discussed above with regard to a user that is authenticated but for which no group identifier is returned. A default service profile for a user that is not authenticated may be one that that indicates a basic level of service. The user may be restricted to only certain limited types of access. For example, the service profile may specify a guest portal attribute as having a value of "on." This attribute may indicate that the user may only be allowed to access general network resources, such as the Internet, but not allowed to access other parts of a network environment, as discussed previously.

Figure 5:
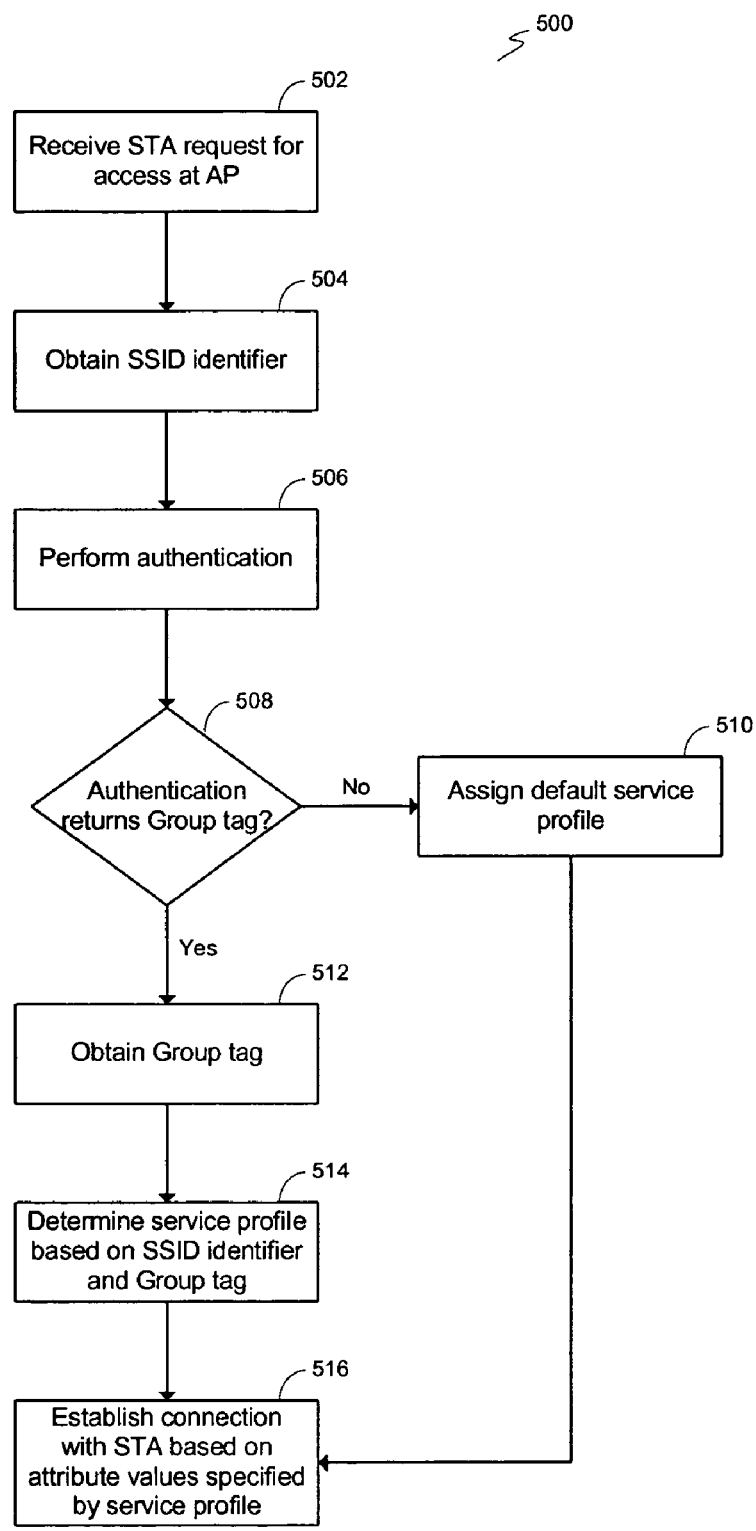
FIG. 5 is a flow chart showing steps in a process 500 for using service profiles to specify wireless network service attribute values, in accordance with one embodiment of the present invention.

FIG. 5 is a flow chart showing steps in a process 500 for using service profiles to specify wireless network service attribute values, in accordance with one embodiment of the present invention. In a step 502, a request for wireless network connection is received at an AP from an STA. This may be a STA that has recently moved into radio signal range of the AP and is attempting to associate with the AP. At a step 504, an SSID is obtained. In one implementation, the AP has a known SSID value, and the AP uses this known SSID value. In other implementations, the SSID value may be provided to the AP. In a step 506, the AP proceeds with an authentication process in an attempt to authenticate the STA. This may involve utilizing an authentication server located elsewhere. For example, it may involve use of a RADIUS server, as described previously. The authentication process may result in successful authentication of the STA, in which case the authentication server may return a group tag associated with the STA. However, in some cases successful authentication may not necessarily result in the return of a group tag for the STA, as mentioned before. Also, if the STA is not authenticated successfully, no group tag may be returned.

In a step 508, a determination is made as to whether a group tag is returned from the authentication process. If a group tag for the STA is not returned, the process moves to a step 510. In step 510, a default service profile is assigned to the STA. The default service profile may specify various service attributes consistent with a basic level of service. For example, a relatively low qualify of service (QoS) may be specified. Also, a guest portal option may be turn on, such that the STA only be allowed to access general network resources, such as the Internet, but not allowed to access other parts of a network environment. If a group tab for the STA is returned, the process moves to a step 512. At step 512, a service profile is determined for the STA based on the SSID and group tag obtained for the STA. The service profile may specify various service attributes consistent with a particular level of service. Different service profiles can specify different values for various service attributes to flexibly define a wide range of diverse service possibilities. At a step 516, the AP establishes a network connection for the STA, based on the service attributes specified by the particular service profile for the STA.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for determining wireless network service characteristics comprising:
   storing an array of service profiles, each profile uniquely identified by a combination of a wireless local area network (WLAN) identifier and a group identifier;
   receiving at an access point (AP) a request from a station (STA) for wireless network access;
   obtaining a first identifier specifying a wireless local area network (WLAN) to which the STA is to be connected;
   obtaining a second identifier from an authentication process relating to the STA upon successful authentication of the STA;
   selecting a service profile from the array for the STA based on the first identifier and the second identifier when the STA is successfully authenticated, wherein the service profile specifies a value for each of a plurality of service attributes;
   selecting a first default service profile for the STA when the STA fails to successfully authenticate;
   selecting a second default service profile for the STA when the STA is successfully authenticated but the second identifier is not successfully obtained, the second default service profile is non-identical to the first default service profile; and
   establishing a connection for wireless communications between the STA and the AP based on the selected service profile, wherein the connection is characterized by the value specified for each of the plurality of service attributes.

2. The method of claim 1 wherein the first identifier specifying a WLAN comprises a service set identifier (SSID).

3. The method of claim 2 wherein the SSID is associated with a wireless network connection service provider.

4. The method of claim 1 wherein the second identifier comprises a group identifier associated with the STA, wherein the group identifier indicates membership of the STA in a group.

5. The method of claim 1 wherein the authentication process involves authenticating a user of the STA by using a Remote Authentication Dial-In User Service (RADIUS) process.

6. The method of claim 1 wherein one of the plurality of service attributes identifies a virtual local area network (VLAN).

7. The method of claim 1 wherein one of the plurality of service attributes identifies a quality of service (QoS).

8. The method of claim 1 wherein one of the plurality of service attributes identifies an encryption technique.

9. The method of claim 1 wherein one of the plurality of service attributes identifies a guest portal state.

10. A method for determining wireless network service characteristics comprising:
    receiving at an access point (AP) a request from a station (STA) for wireless network access;
    attempting to perform an authentication process relating to the STA;
    when the authentication fails, determining a first default service profile for the STA, wherein the first default service profile specifies a value for each of a plurality of service attributes;
    when the authentication succeeds, attempting to obtain a group identifier associated with the STA indicating a group to which the STA belongs;
    when the group identifier is not returned, determining a second default service profile for the STA, the second default service profile is non-identical to the first default service profile; and
    establishing a connection for wireless communications between the STA and the AP based on which of the first and second default service profiles is determined for the STA, wherein the connection is characterized by the value specified for each of the plurality of service attributes by the determined default service profile.

11. A system for determining wireless network service characteristics comprising:
    an array of service profiles, each profile uniquely identified by a combination of a wireless local area network (WLAN) identifier and a group identifier;
    an access point (AP) that receives a request from a station (STA) for wireless network access;
    wherein the AP obtains a first identifier specifying a wireless local area network (WLAN) to which the STA is to be connected and obtains a second identifier from an authentication process relating to the STA;
    wherein the AP selects a service profile for the STA from the array based on the first identifier and the second identifier, the service profile specifying a value for each of a plurality of service attributes;
    wherein the AP selects a first default service profile when the STA fails to successfully authenticate;
    wherein the AP selects a second default service profile when the STA is successfully authenticated but the second identifier is not successfully obtained, the second default profile is non-identical to the first default service profile; and
    wherein the AP establishes a connection for wireless communications between the STA and the AP based on the selected service profile, the connection characterized by the value specified for each of the plurality of service attributes.

12. The system of claim 11 wherein the first identifier specifying a WLAN comprises a service set identifier (SSID).

13. The system of claim 12 wherein the SSID is associated with a wireless network connection service provider.

14. The system of claim 11 wherein the second identifier comprises a group identifier associated with the STA, wherein the group identifier indicates membership of the STA in a group.

15. The system of claim 11 wherein the authentication process involves authenticating a user of the STA by using a Remote Authentication Dial-In User Service (RADIUS) process.

16. The system of claim 11 wherein one of the plurality of service attributes identifies a virtual local area network (VLAN).

17. The system of claim 11 wherein one of the plurality of service attributes identifies a quality of service (QoS).

18. The system of claim 11 wherein one of the plurality of service attributes identifies an encryption technique.

19. The system of claim 11 wherein one of the plurality of service attributes identifies a guest portal state.

20. A system for determining wireless network service characteristics comprising:
- an access point (AP) capable of receiving a request from a station (STA) for wireless network access;
- wherein the AP is further capable of attempting to perform an authentication process relating to the STA;
- wherein, when the authentication fails, the AP is further capable of determining a first default service profile for the STA, the service profile specifying a value for each of a plurality of service attributes;
- wherein, when the authentication succeeds, the AP is further capable of attempting to obtain a group identifier associated with the STA indicating a group to which the STA belongs;
- wherein, when the group identifier is not returned, the AP is further capable of determining a second default service profile for the STA, the second default service profile is non-identical to the first default service profile; and
- wherein the AP is further capable of establishing a connection for wireless communications between the STA and the AP based on which of the default service profiles is determined for the STA, the connection being characterized by the value specified for each of the plurality of service attributes by the determined default service profile.

21. A system for determining wireless network service characteristics comprising:
- means for storing an array of service profiles, each profile uniquely identified by a combination of a wireless local area network (WLAN) identifier and a group identifier;
- means for receiving at an access point (AP) a request from a station (STA) for wireless network access;
- means for obtaining a first identifier specifying a wireless local area network (WLAN) to which the STA is to be connected;
- means for obtaining a second identifier from an authentication process relating to the STA;
- means for selecting a service profile from the array for the STA based on the first identifier and the second identifier, wherein the service profile specifies a value for each of a plurality of service attributes;
- means for selecting a first default service profile for the STA when the STA fails to successfully authenticate;
- means for selecting a second default service profile for the STA when the STA is successfully authenticated but the second identifier is not successfully obtained, the second default service profile is non-identical to the first default service profile; and
- means for establishing a connection for wireless communications between the STA and the AP based on the selected service profile, wherein the connection is characterized by the value specified for each of the plurality of service attributes.

22. A computer-readable storage medium having instructions stored thereon that when executed by a processor, cause a computer to perform the following steps:
- receiving a request from a station (STA) for wireless network access;
- obtaining a first identifier specifying a wireless local area network (WLAN) to which the STA is to be connected;
- obtaining a second identifier from an authentication process relating to the STA upon successful authentication of the STA;
- selecting a service profile for the STA from an array of service profiles based on the first identifier and the second identifier when the STA is successfully authenticated, wherein the service profile specifies a value for each of a plurality of service attributes, and wherein each of the array of service profiles is uniquely identified by a combination of a wireless local area network identifier and a group identifier;
- selecting a first default service profile for the STA when the STA fails to successfully authenticate;
- selecting a second default service profile for the STA when the STA is successfully authenticated but the second identifier is not successfully obtained, the second default service profile is non-identical to the first default service profile; and
- establishing a connection for wireless communications between the STA and an access point (AP) based on the selected service profile, wherein the connection is characterized by the value specified for each of the plurality of service attributes.

23. An apparatus for use in a wireless network, comprising:
- an authentication component that receives a request from a station (STA) for wireless network access;
- wherein the authentication component obtains a first identifier specifying a wireless local area network (WLAN) to which the STA is to be connected and obtains a second identifier from an authentication process relating to the STA;
- wherein the authentication component selects a service profile for the STA from an array of service profiles based on the first identifier and the second identifier, each service profile uniquely identified by a combination of a wireless local area network identifier and a group identifier, and each service profile specifying a value for each of a plurality of service attributes;
- wherein the authentication component selects a first default service profile when the STA fails to successfully authenticate;
- wherein the authentication component selects a second default service profile when the STA is successfully authenticated but the second identifier is not successfully obtained, the second default profile is non-identical to the first default service profile; and
- wherein the authentication component establishes a connection for wireless communications between the STA and an access point (AP) based on the selected service profile, the connection characterized by the value specified for each of the plurality of service attributes.

* * * * *